July 1, 1924.  
H. RAMELOW  
1,499,548  
TROLLEY HARP AND MEANS FOR EFFECTIVELY OPERATING THE SAME  
Filed Nov. 12, 1923
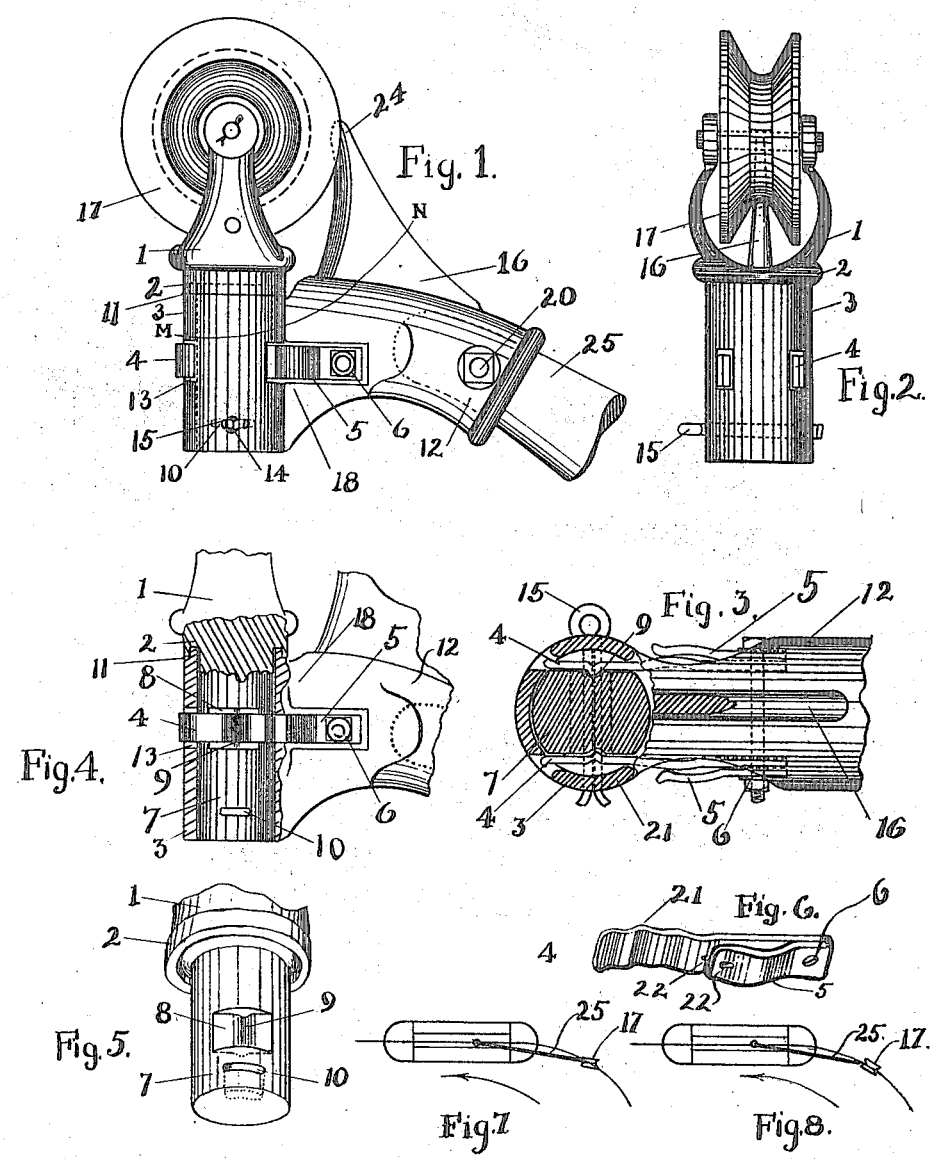
Witnesses:
1. Stephen W. Horton
2. Mabel McCall
Henry Ramelow
INVENTOR.
BY A.B. McCall
ATTORNEYS.

Patented July 1, 1924.

1,499,548

UNITED STATES PATENT OFFICE.

HENRY RAMELOW, OF SPRINGFIELD, ILLINOIS.

TROLLEY HARP AND MEANS FOR EFFECTIVELY OPERATING THE SAME.

Application filed November 12, 1923. Serial No. 674,265.

*To all whom it may concern:*

Be it known that I, HENRY RAMELOW, a citizen of the United States, residing at Springfield, in the county of Sangamon, State of Illinois, have invented certain new and useful Improvements in Trolley Harps and Means for Effectively Operating the Same, of which the following is a specification.

This invention relates to electric trolley wheel harps of the character that is adapted to be easily and quickly attached or removed, and when in operation on a street car or other electric trains that secure their power from a trolley wire, is adapted to stand in a vertical position when mounted on its support as it pulls a trolley wheel against a trolley wire.

The purposes of this invention, therefore, are first to provide an economic and simple device that in its method of operation will have a tendency to prolong the life of a trolley wheel.

A further object of my invention is to provide a device that is adapted to be revolubly mounted in a vertically positioned tubular support in such a way that when functioning as a harp for a trolley wheel it will oscillate when necessary upon its support when in normal use and thus allow a trolley wheel to keep in perfect alignment with a trolley wire at all times and particularly at a time when the car is negotiating even the shortest of curves.

A further object of my invention is to provide a trolley wheel harp of the character described that is provided with means for normally holding the trolley wheel harp in alignment with the trolley pole and trolley wire when the car is traveling. In this device this much desired result is accomplished through the springy action of two side mounted inwardly pressing springy devices which are adapted to exert on corresponding opposite sides of the shank of said trolley harp, against a flattened surface thereon, an inward horizontal pressure that will tend to retract said trolley harp to a position of normal alignment with said trolley pole and trolley wire after the same has been slightly revolved on its support in negotiating a curve.

A further object of my invention is to provide a trolley harp that has adequate springy means for limiting the oscillations of the trolley wheel that might be supported thereby and yet allow said trolley harp and wheel to oscillate sufficiently to enable the same to keep in easy alignment with the trolley wire when negotiating a curve and to normally cause the same to retract to a normal position of alignment with the trolley pole and trolley wire after getting back on a straight track again.

In the subsequent references in this specification, I shall point out the several novel features of my device which after a six months' test with one and the same trolley wheel and harp in actual street car service every single day of the six months, proved beyond question its practical design and that it accomplishes the purpose for which it was designed when, during that test, the same wheel was used and ran more than thirty thousand miles during the six months and the same trolley wheel is still fit for two more months of similar service, whereas under ordinary conditions the same wheel would have been worn out, in from seven days to two weeks.

This much desired and much needed result is attained by the vertical trolley harp and means for effectively operating the same which is described in the annexed specification, recited in the claims, and illustrated in the accompanying drawings in which, like reference numerals indicate the same structural parts in the several figures.

Fig. 1 is a side elevation of the trolley harp of my invention as it would look when normally seated on its tubular support.

Fig. 2 is a rear elevation of the trolley harp of my invention.

Fig. 3 is a horizontal partial cross-section from M to N exposing therein some of the structural details and the relation of parts of my invention.

Fig. 4 is a vertical longitudinal section of the harp support showing the relation of the harp shank to integral cap flange of the trolley harp of my invention.

Fig. 5 is a perspective of the trolley harp shank and integral annular cap flange of my invention. This perspective also shows in good detail the vertical side plane faces notched into the shank for the accommodation of the side springs above mentioned when in normal use. This perspective also shows the wide cotter-pin hole through the end of the shank which is adapted to accommodate a cotter-pin when in common use which cotter-pin is used to prevent the shank from slipping out of the tubular support and in the meantime allow the shank to oscillate to a limited extent.

Fig. 6 is a perspective of a detail design illustrating the construction of the side springs which are adapted to exert a side pressure on the corresponding notched side plane faces of the shank of the harp tending to hold the harp normally in alignment with the trolley pole, and yet have enough resiliency to allow the harp to operate to an extent within predetermined limits so that the trolley wheel may freely follow the trolley wire on a curve and because of the function of the springs be normally retracted thereafter to proper alignment with the trolley pole after negotiating the curve.

Fig. 7 is a little sketch showing how the trolley wheel that is in ordinary use contacts in a side swiping position with the trolley wire when negotiating a curve, which action is bound to wear a trolley wheel out in a hurry.

Fig. 8 is a view similar to the view in Fig. 7, except that it shows the trolley wheel in perfect alignment with the trolley wire when turning a curve, which is made possible when using the trolley harp of my invention.

The preferred embodiment of my invention is illustrated in the several figures above mentioned and the desired means of operating this device will be clearly understood by carefully observing the figures given with the instructions which follow for normally operating the device of my invention:

Referring now to the several elements of my invention shown in the respective figures, which elements are designated by numerals, I shall attempt to point out the relation of the several parts to the whole structure and the effective means of operating the same.

When it is desired to put this device into practical use trolley wheel 17, is mounted on harp 1 in the usual way, then the trolley harp is mounted into operating position by inserting shank 7 into vertical tubular support 3 and allowing said shank to drop to its normal bearing position so that annular flange cap 2 will rest on and encompass shoulder 11 in which case shoulder 11 serves as a bearing support for the trolley harp while annular flange cap 2 covers and protects said bearing. After the harp shank 7 is inserted in position, cotter-pin 15 is inserted into hole 14 in the tubular support and allowed to pass through slot 10 in the harp shank 7 in which position it serves as stop means to prevent said harp shank from lifting out of said tubular support for the same.

In this connection it is to be particularly observed that when said shank is in operating position springs 4 and 5 are mounted into cooperative position as shown in Figure 1 while at the same time similar springs are respectively mounted on the opposite side of said harp support as is shown in Figure 3. After these corresponding springs are mounted, bolt 6 is then used to removably secure said springs into position where they normally function as means for retracting said trolley harp to a position of alignment with the trolley pole and head after said harp has been caused to oscillate slightly by reason of the pull exerted on the flanges of the trolley wheel in the tendency to hold itself into a position of alignment with the trolley wire in negotiating a curve.

It is at this point essential to observe that the design of this trolley harp which enables the trolley wheel to very easily oscillate slightly on the supporting axis of the harp, makes it possible for the trolley wheel to stay in perfect moving alignment with the trolley wire in turning a curve and thus reduce the surface of contact to a very minimum and then keep the point of contact in the bottom of the groove where it normally should touch, a result obtained by the novel features in the design of this trolley harp, which result allows the trolley wheel to normally roll on the trolley wire as it should do and thus reduce friction to a minimum instead of causing the wheel to side swipe and grate its flanges against the trolley wire thus causing a maximum of friction and consequent wear on the trolley wheel itself.

It has been demonstrated in actual tests with the device of my invention that because of the merits in its design it functions so perfectly that it actually permits the trolley wheel when used in connection therewith to last many times the life of a similar trolley wheel in use with the ordinary trolley harp at present in common use.

Particular attention is called to the specific design of springs 4 and 5. Where spring 4 operates to exert a springy pressure inwardly on correspondingly opposite sides of the harp shank where it is adapted to press against notched flat surface 8 and particularly shaped and fitted to a position where kink 21 normally rests in depression 9 in notch 8 of the harp shank. It is here further noted that longitudnal ridge 23 normally rests in longitudinal slot 22 in which position it is adapted to hold auxiliary spring 5 more securely into operating position where it serves as additional pressure means in aiding the functioning of spring 4.

Fin guard 16 is made integral with the trolley head 12 and is so positioned as to normally hold the top point of the fin guard in front of and between the flanges of the trolley wheel 17, there to serve as limiting means for preventing excessive oscillation of the trolley wheel as well as to also prevent the cross supporting wires of the trolley wire from getting caught in the trolley wheel in case the trolley wheel should accidently be thrown off the wire, which incidently is a thing that seldom happens when using the trolley harp of my invention.

It will be noted that the tubular harp support 3, fin guard 16, spring guard 18 and trolley head 12 are all made integral and that when said trolley head is mounted for use, trolley pole 25, Fig. 1, is inserted into the socket in head 12 and removably secured thereto by means of bolt 20, making quick replacement of parts possible.

It is obvious that certain minor details in the construction of my invention may be altered in their design and still stay within the spirit and scope of my invention.

Having thus described the nature of my invention, what I claim as new and useful, and desire to secure by Letters Patent is:

1. The combination with a trolley wheel and vertical trolley harp of a tubular support for the harp, and a solid integral shank of the harp removably fitted into the tubular support; annular, integral flanged cap means with said solid harp shank for covering the supporting shoulder of the tubular support for the harp; a vertical fin guard integral with the harp support and positioned in front of the trolley wheel with a point between the flanges thereof adapted to normally hold the extent of wheel oscillations within predetermined limits; means provided in corresponding opposite cooperating springs for normally retracting the oscillations of the harp and wheel to a position of alignment with the trolley pole after turning a curve and yet permitting slight limited oscillations of the wheel allowing the same to keep in perfect alignment with the trolley wire while turning the curve.

2. The combination with a trolley wheel and a vertical trolley harp, of a vertical shank integral with the harp, an annular cap flange integral with the harp and shank; vertical correspondingly oppositely notched plane surfaces on the shank; a tubular support for the harp adapted to accommodate the shank of the harp, the top annular shoulder of said tubular support removably supporting said annular cap flange of the harp; a fin guard integral with the tubular support for the harp and positioned in front of the trolley wheel adapted to hold said trolley wheel within predetermined oscillating limits; means for removably securing the harp in the tubular support and means for automatically retracting said vertical harp to a position of a normal alignment with the trolley pole after turning a curve, as and for the purpose set forth.

3. In a trolley harp of the character described having a solid vertical cylindrical shank integral with an annular flange cap and a tubular support for the harp adapted to accommodate said cylindrical shank and protected from water by said annular flange cap, and having integral with said tubular support a fin guard positioned to prevent excessive oscillation of a trolley wheel when in operation; and having means provided in corresponding vertical parallel grooves on opposite sides of said shank; a pair of corresponding oppositely positioned removably secured leaf springs shaped to exert a horizontal inward pressure simultaneously against said notches on said shank respectively as and for the purpose set forth.

4. In a device of the character described, the combination, comprising a vertical trolley harp, a vertical tubular support for the harp, a vertical solid cylindrical shank integral with the harp, and an annular flange cap integral therewith, adapted to cover said tubular support and serve as a bearing for said vertical harp; notched parallel vertical grooves on the shank of said harp located on corresponding opposite sides thereof, and having respectively therein longitudinal center grooves; side leaf springs removably secured to the sides of said harp support and adapted to press inwardly simultaneously on said notched correspondingly opposite parallel vertical grooves on the shank of said harp; stop means provided in projections in said support for the harp, adapted to prevent accidental vertical adjustment of said springs, and stop means further provided in a removably secured anchoring pin passing through the base of said harp support shank and tubular support therefor adapted to prevent accidental removal of the harp from its tubular support.

5. A vertical trolley harp integral with a vertical cylindrical notched shank and annular flange cap and fin guard; said trolley harp oscillatably mounted on a vertical cylindrical tubular support for the shank of the harp; integral means with said tubular support provided in a fin guard for holding oscillating harp movements within predetermined horizontal adjustment limits; further integral means for removably securing said trolley harp support to a trolley pole for operating use; removable spring means mounted on corresponding opposite sides of said support and adapted to normally exert an inward pressure simultaneously against the notched grooves on the corresponding sides of said cylindrical shank for effecting automatically a normal retraction of said harp to a predetermined position of alignment with said trolley pole after negotiating curves, whereon the relative corresponding positions of the trolley wheel and pole would normally be slightly out of alignment due to the slight oscillation of the trolley harp in permitting the trolley wheel to keep in perfect alignment with the trolley wire even while turning a curve.

6. In a vertical trolley harp and support the combination with a solid vertical cylindrical shank of the harp having opposite side notched grooves integral with an annular flange cap and a vertical tubular support; of a pair of side springs removably secured to the side of the support; an integral fin guard means secured to the support forward of the trolley wheel and adapted to prevent excessive oscillations of the wheel; a key way through the bottom end of said shank and tubular support and a cotter key for the key way adapted to prevent accidental removal of said harp shank from the tubular support for the same; removably secured side springs on corresponding opposite sides of said harp support adapted to automatically exert simultaneously an inward side pressure on said notched grooves of said vertical cylindrical harp shank for normally effecting an automatic retraction of said harp to a normal position of alignment with the trolley pole after negotiating a curve in transit while supporting a trolley wheel continuously in prefect alignment with the trolley wire in the manner and for the purpose set forth.

In witness whereof, I hereunto set my hand this 26 day of October, 1923.

HENRY RAMELOW.

Witnesses:
A. B. McCall,
J. B. Weaver.